Aug. 31, 1937.  A. F. BRADLEY  2,091,626
BALE TIE
Filed May 11, 1934
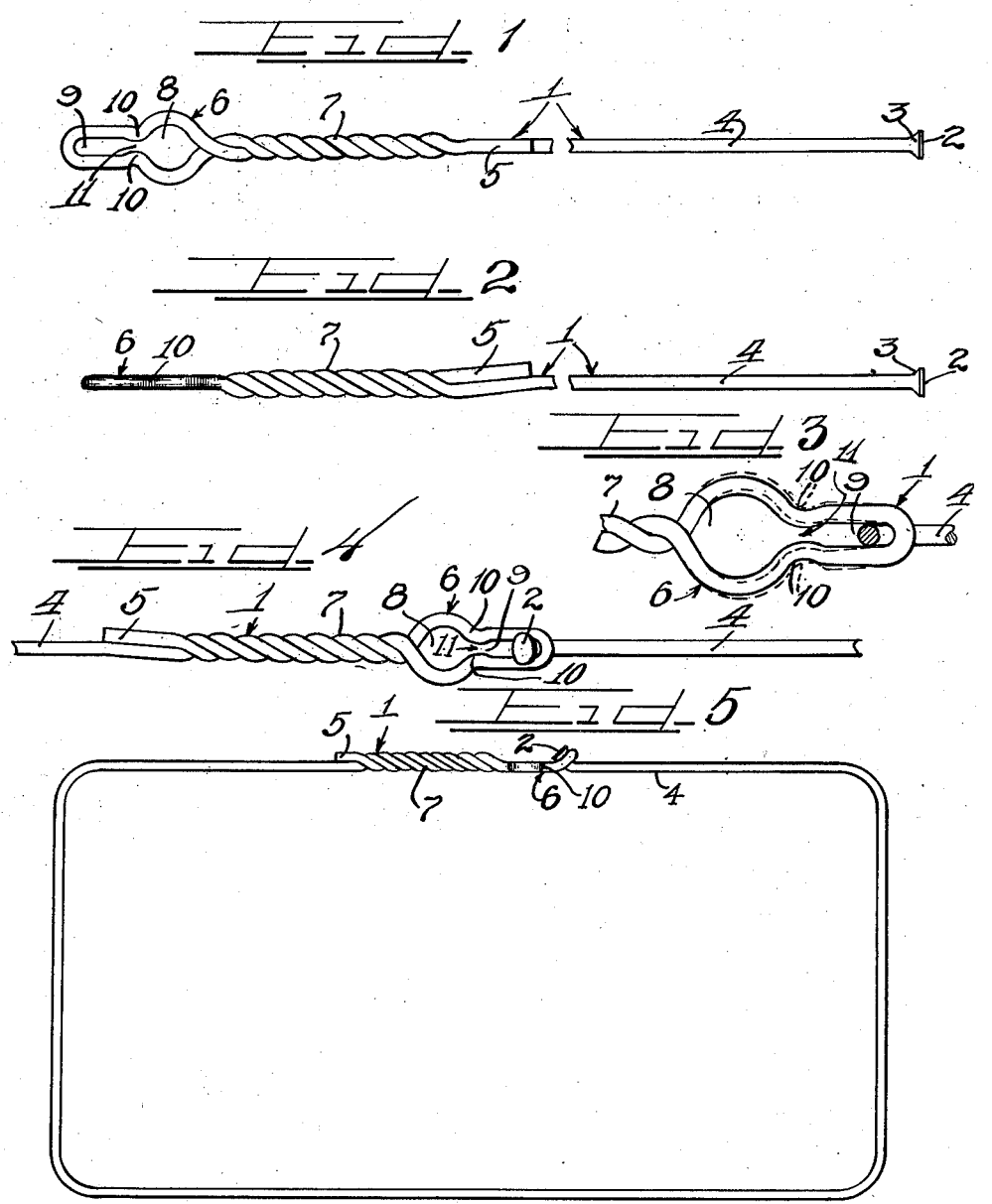
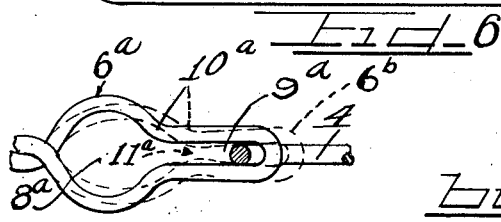
Inventor
Albert F. Bradley Patented Aug. 31, 1937

2,091,626

UNITED STATES PATENT OFFICE 2,091,626

BALE TIE

Albert F. Bradley, Sterling, Ill., assignor to Northwestern Barb Wire Company, Sterling, Ill., a corporation of Illinois Application May 11, 1934, Serial No. 725,061

2 Claims. (Cl. 24—27)

This invention has to do with bale ties and is concerned more particularly with a means for preventing unlocking of the tie when about a bale and prior to release of the bale blocks to allow the bale to expand within the tie.

It is an object of the invention to provide a bale tie of extremely simple construction whereby the ends of the same may be interlocked against accidental separation.

It is another object of the invention to provide a bale tie with yieldable means for permitting the ends of the tie to be interlocked but preventing accidental separation or unlocking of said ends.

It is a further object of the invention to provide a bale tie having at one end means permitting insertion but preventing accidental removal of the other end of the tie.

It is a further object of the invention to provide interlocking bale tie ends enabling the same to be interlocked without necessitating twisting of either end.

In accordance with the general features of the invention, one end of the tie is twisted upon itself to provide a loop having adjacent openings of different sizes, and a communicating passage of less width, normally, than the smaller of the two openings. The material is constricted at said passage and is resilient to permit an element to be snapped therebeyond from the larger into the smaller opening. The other end of the tie is formed with a head large enough to be inserted through the larger opening but too large to be inserted through the small opening. The wire or other material of which the tie is made is of such girth as to fit in the smaller opening but is of greater girth than the width of the passage when the loop is unstressed, so that the wire or the like may snap by the constricted portion and will be prevented by said portion from accidentally moving into the other opening and thus the ends of the tie are interlocked.

The head is formed so as to be strengthened by a tapered shoulder engageable with the end portion of the loop so as to inhibit breaking off of the head due to the tension in the tie upon tendency of the bale to expand.

The tie may be made of any suitable material, wire having been found eminently satisfactory.

In accordance with another feature of the invention, instead of preforming the looped end of the tie with a constricted passage, the looped end may be formed substantially like a key-hole and, after the headed end of the tie is threaded into the loop, a pull exerted by hand upon the ends, or the sides squeezed by a tool, whereby the loop is caused to yield laterally and constrict the loop between the larger and smaller portions of the opening therein, so as to prevent separation of the ends of the tie while the bale is being compressed.

The construction is therefore extremely simple and represents a marked improvement over bale ties heretofore in use, and this improvement is evidenced by a very appreciable demand therefor by users of bale ties.

Other objects and advantages of the invention will appear as the description proceeds.

This invention (in preferred forms) is illustrated in the drawing and hereinafter more fully described.

Figure 1 is a fragmentary plan view of a bale tie constructed in accordance with one form of the invention.

Figure 2 is a front elevational view of Figure 1.

Figure 3 is an enlarged fragmentary plan view of the ends of the tie in interlocked relation.

Figure 4 is a view of a bale tie interlocked about the bale in accordance with the invention.

Figure 5 is an enlarged fragmentary plan view of the interlocked end portions of Figure 4.

Figure 6 is a fragmentary plan view of the ends of another tie made in accordance with the invention in full lines previous to, and in dotted lines after, clinching of the loop.

Referring now more particularly to the drawing, a tie formed in accordance with the present invention is shown generally at 1, having at one end a head 2 which is preferably substantially frusto-conical, having a tapered shoulder portion 3 which, at its narrow end, merges with the body 4 of the wire or other suitable material of which the tie may be made. The other extremity 5 of the tie 1 is bent upon the body 4 to provide a loop 6 of substantially key-hole formation and then twisted with the body at 7 so as to be securely fastened thereto. The loop 6 provides a relatively large opening 8 and a relatively narrow opening 9, the former being sufficiently large to admit the head 2 and the latter being sufficiently wide to admit the body portion 4 of the tie but not the head 2. At the juncture of the openings 8 and 9, the loop 6 is provided with portions 10 bent toward each other to provide a constricted communicating passage or "strait" 11. The strait 11 is preferably slightly narrower than the body 4, just sufficient to necessitate the application of tension by hand to force the body 4 through the same from the larger opening 8 to the smaller opening 9, and to prevent return of the body 4 from the opening 9 to the larger opening 8 without the exertion of substantial pressure tending to force the portions 10 apart. The tie is preferably made of such material as to be pliable so that a straight tie may be bent around a body to be baled and will take a permanent "set" only after being subjected to a substantial stress. The material should, however, be such as to be slightly resilient so that the body portion 4 may be snapped through the strait 11 by hand without causing a permanent set in the loop structure, so that after the portion 4 is snapped or forced through the strait 11 into the narrow opening 9, the portions 10 will assume their normal positions providing the strait 11 which will be narrower than the body 4 and thus prevent accidental movement of the body 4 into the larger opening 8.

The bale tie made in accordance with the present invention obviously requires no hand-wrapping as is true of bale ties heretofore in vogue. It is necessary merely to pass the ends comprising the head 2 and loop 6 through the grooves of the baler blocks, pass the head 2 through the larger opening 8 in the loop, pull or push the body 4 of the tie adjacent the head toward the smaller opening 9 so as to cam the portions 10 of the loop apart sufficiently to allow the body 4 to pass therebeyond and into the smaller opening 9, the portions 10 again assuming their normal relationship after the body 4 has passed beyond the same. The portions 10 thereafter serve as retaining means preventing accidental movement of said body portion back into the larger opening 8, and thus the portions 10 prevent separation of the ends 2 and 6. Accordingly after these ends are interlocked as just described, no further attention need be paid them and, upon release of the baler blocks, the bale will expand so as to tightly tension the bale tie, thereby causing the ends 2 and 6 to be more firmly interlocked and become practically inseparable. The ends of the tie do not project appreciably from the bale but, on the contrary, due to the tendency of the bale to expand, the material baled will bulge on opposite sides of the tie so that the entire tie will be disposed substantially within the periphery of the bale. This provides a much neater bale than has heretofore been the case. In addition, there is no slipping or chafing of the parts of the wire together, so that the wire is not weakened by the baling operation. By eliminating the injurious and tiring hand-wrapping of the tie, one man can, in many cases, do the work that ordinarily requires two men. Thus easier, faster and more economical baling is made possible. The ties are preferably made of the same size for the same bundle, so that the two or more ties employed on a bundle will cause the bale to have a uniform appearance. The absence of projecting portions of the tie enables the bale to stand rougher handling since the likelihood of interlocking ties of different bales is substantially eliminated and avoids danger to handlers.

The construction heretofore described is applicable to ties of any desired size wire or the like.

The invention comprises the provision of ties which are adapted to completely encircle the bale, and it is also within the province of the invention to provide splicers or splicer wires which are relatively short. Thus when a tie intended to encircle a bale is employed with a larger bale, a splicer wire having its ends formed respectively with a head 2 and loop 6 may be used, so that the head of the splicer wire may be interlocked with the loop of the tie wire, and the loop of the splicer wire may be interlocked with the head of the tie wire, in a manner hereinabove described, thus providing a complete tie for the bale. Thus the invention may be employed in connection with either a one-piece tie or a tie made of a plurality of pieces whose end portions are formed so that the ends of each will interlock with the adjacent ends of the other or others.

The ties and splicer wires may be provided in any sizes as hereinbefore mentioned, 14, 14½, 15 and 15½ gages having been found satisfactory for many uses.

The portions 10 may be formed as above described at the time of manufacture of the tie 1, although, if desired, the same may be clinched toward each other to retain the headed end 2 of the tie after the same is positioned in the narrow opening 9, to prevent accidental separation of the ends. This clinching may be effected by the use of a tool such as a pair of pliers engaging the outer parts of the portions 10 and forcing the same toward each other, causing a permanent set in the material.

Where relatively thin wire is employed, as in connection with bales of small girth, the loop 6a may be initially formed without the constricted passage shown in Figures 1, 3, and 4. With such a loop construction, the end 2a may be projected thru the larger opening 8a and readily slipped into the smaller opening 9a. Portions of the tie adjacent the ends 2a and 6a are thereupon grasped and pulled away from each other so that the head is positioned at the closed end of the opening 9a, the resultant tension on the large part of the loop 6a causing the same to become constricted and thus forcing the portions 10a toward each other to constrict the opening 9a as shown at 11a in dotted lines and thus prevent accidental separation of said ends while the material to be bundled is being baled and prior to release of the bale to allow the same to expand. Expansion of the bale of course causes further constriction and renders the connection substantially permanent. It will be understood that in this form of the invention, the material of which the tie is made will yield to the tension applied by the attendant himself. Of course where the wire or other material is of such gage as to resist substantial deformation at the loop in response to a pull by hand, the portions 10 will preferably be caused to be positioned closer together as shown in Figures 1, 3, and 4 either in the manufacture of the tie initially, or thereafter by the application of a tool as previously described.

With this tie construction, the tie may be made shorter than is true of ties whose ends must be turned at different angles relative to each other in order to enable the same to interlock. With the above described construction, the tie need be only slightly longer than the peripheral groove in the baler blocks in which the tie is fitted, the excess in length being merely that which will enable the head of the tie to overlap the loop sufficiently to enable the head to be passed through the large opening 8 or 8a, prior to slipping the head back to the outer or closed end of the narrow opening 9 or 9a.

While the invention has been illustrated in certain forms as embodying a loop of substantially key-hole shape, it will be understood that other shapes of loop may be used, preferably providing a larger opening and a relatively smaller opening for the purposes hereinbefore stated.

Splicer wires may be made from the more yieldable material to which reference is made above in connection with Figures 6 and 7, to cooperate with a tie wire or with tie wire and other splicer wires if desired, as the occasion requires.

It is to be understood that the invention in its broad aspect involves a bale tie and construction affording retaining means which is made readily effective to prevent accidental separation of the ends of the tie.

The loop 6b may if desired be given its constriction at 11a merely by pressing the wire at the juncture of the narrow and wide portions with a pair of pliers or other suitable means.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A bale tie comprising a wire strand having a loop at one end and having its other end upset to provide a head for cooperation with the loop, said head being coaxial with the adjacent portion of the strand, and having a sloping peripheral wall so as to have a wedging engagement with the loop when the tie is tensioned about a bale.

2. A bale tie comprising a wire strand having a loop at one end terminating in a slot having a restricted entrance from said loop, and having a head at its other end with a sloping portion merging into the strand and directed toward said loop, said head being adapted for insertion through said loop and said strand being adapted for passing through said restricted entrance for wedgingly engaging said head with the end of said slot when the tie is tensioned about a bale.

ALBERT F. BRADLEY.